INVENTORS R. T. DENTON
L. J. VARNERIN, JR.
BY Wilford L. Wisner
ATTORNEY

March 25, 1969 R. T. DENTON ET AL 3,435,234

SOLID STATE IMAGE TRANSLATOR

Filed Dec. 29, 1965 Sheet 2 of 4

United States Patent Office 3,435,234
Patented Mar. 25, 1969

3,435,234
SOLID STATE IMAGE TRANSLATOR
Richard T. Denton, South Plainfield, and Lawrence J. Varnerin, Jr., Watchung, N.J., assignors to Bell Telephone Laboratories, Incorporated, New York, N.Y., a corporation of New York
Filed Dec. 29, 1965, Ser. No. 517,335
Int. Cl. H01j 39/12
U.S. Cl. 250—209 7 Claims

ABSTRACT OF THE DISCLOSURE

The specification describes a device which is based on the recognition that an image can be translated into electrical output signals responsive to discrete points thereof by associating a set of photosensitive elements responsive to the incident image with a second set of photosensitive elements that provide optically scannable series switches for each of the image-responsive elements. By preventing charge leakage when darkened, the switching elements permit charge to be accumulated by the image-responsive elements throughout an entire scanning cycle. The capacitances of the image-responsive elements are preferably much larger than the switching element capacitances, and switching element electron-hole-pair lifetimes are preferably as short as possible to permit efficient transfer of the stored charge of the image-responsive elements to the output. The apparatus can be made as an integrated beam-lead structure.

This invention relates to a photoelectric device and more particularly to a photoelectric device capable of analyzing a two-dimensional light pattern.

In such areas as television transmission and subscriber image transmission in telephony, a vacuum tube camera such as the vidicon tube or iconoscope tube has been employed to provide beam-type scanning of the electric charge configuration formed in a photosensitive medium by an incident image.

Although such vacuum tubes have excellent sensitivity to incident radiation, they are not sufficiently rugged, reliable and long-lived for some uses. For example, widespread transmission of subscriber images within the telephone network may not be economically feasible until a more rugged, reliable and long-lived type of camera can be found. At the same time it is desirable not to sacrifice camera sensitivity.

The present invention provides a solid-state photoelectric device that is an improvement in the above respects, and is scannable by a light beam. The device may be economically fabricated by so-called beam-lead techniques.

A feature of the invention is the back-to-back arrangement within the device of two sets of photosensitive elements, the first set being responsive to the incident image and the second set comprising optically scannable series switches in series with the image-responsive elements. The image-responsive elements accumulate charge continuously throughout a scanning cycle; and the series switching elements prevent leakage except for the brief moment that each series switching element is illuminated by the scanning beam. The sensitivity of the device is thereby enhanced.

A further feature of the invention involves the mutual adaptation of the image-responsive elements and series switching elements to provide efficient transfer of the stored charge of the image-responsive elements to the output. To this end, the capacitances of the image-responsive elements are much larger, preferably an order of magnitude larger, than the capacitances of the series switching elements; and the switching element electron-hole pair lifetimes are as small as possible.

Further features and advantages of the invention will become apparent from the following detailed description, considered together with the drawing, in which.

Figure 1:
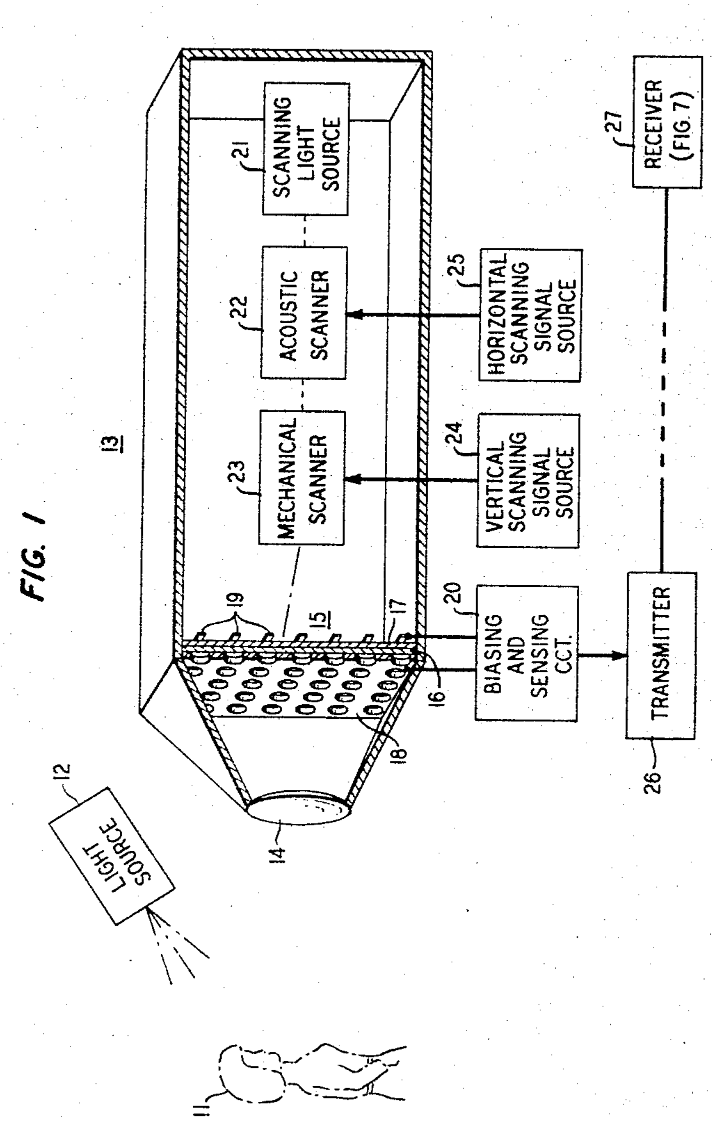
FIG. 1 is a partially pictorial and partially block diagrammatic showing of a preferred embodiment of the invention employed in a communication system.

In FIG. 1, a subject 11 is illuminated by light from a light source 12. For example, the light may be the diffuse low-level illumination normally present in a telephone subscriber's home. Reflected light rays from the subject 11 are admitted to a camera 13 through an image-forming lens 14, the image being brought to a focus upon the nearest surface of the photoelectric device 15. The photoelectric device 15, according to the present invention, comprises the back-to-back layers 16 and 17 of diodes, a diode from each layer being connected serially with an adjacent diode in the other layer between the output electrodes 18 and 19. The output electrodes 18 and 19 are connected to a biasing and sensing circuit 20, which will be described in more detail hereinafter.

The diodes in layer 16 respond to the incident image by storing charge, in a manner to be more fully described hereinafter. The diodes in layer 17 are selectively irradiated, that is, scanned by a light beam emanating from the light source 21 and passing in tandem through the acoustic scanner 22, which provides the horizontal deflection, and through the mechanical scanner 23, which provides the vertical deflection. The horizontal and vertical scanning signals are supplied from sources 24 and 25, respectively, to scanners 23 and 22, respectively.

Each time the scanning light beam strikes a diode in layer 17, a pulse responsive to the intensity of a point in the image appears at the output of biasing and sensing circuit 20. The resulting pulse train is applied to a transmitter 26 and is transmitted to a receiver 27.

The lens 14 is of conventional type and is mounted in an aperture of the frame of camera 13. The frame is opaque in order to shield the device 15 from background light and to shield each side thereof from light directed upon the other side.

The scanning light source 21 is illustratively a gallium arsenide diode laser or other diode laser; but it could also be some other laser operating in the infrared or visible portions of the spectrum or an incoherent light source filtered to be substantially monochromatic. The acoustic scanner 22 employs a lithium metaniobate crystal and is of the general type disclosed in the copending patent application of Lenzo, Nassau and Spencer, Ser. No. 483,259, filed Aug. 27, 1965, and assigned to the assignee hereof. Since the horizontal scanning signal from source 25 typically is an UHF signal, i.e., 50–100 mc., a preferred modification of the Lenzo et al. deflector for this case is the use of a potassium-sodium niobate transducer for applying the scanning signal to the lithium metaniobate crystal. A suitable potassium-sodium niobate transducer is disclosed by Egerton et al. in Patent No. 2,976,246, and is bonded to a lateral surface of the lithium metaniobate crystal with respect to the light propagation direction. For other conditions requiring higher scan frequencies, the Lenzo et al. deflector may be used without modification.

The mechanical scanner 23 illustratively is a moderate-speed (10,800 r.p.m.) mirror drum scanner of the type disclosed by Zworykin and Morton in FIG. 8.5 of their book Television, John Wiley and Sons, Inc., New York, 2nd ed., 1954, at p. 268. This scanner is called the frame scanner. It has three mirror elements and is driven by a synchronous motor in response to the vertical scanning signal from source 24.

Source 24 is a conventional source of line frequency (60 c.p.s.) power for running the synchronous motor at 10,800 r.p.m.

Source 25 is a frequency-sweep generator of conventional type, producing a signal varying from 50 to 100 megacycles per second 8,100 times per second, in order to scan the light beam across 135 lines per frame period (1/60 sec.). It is noted that the angle of deflection of the light beam by scanner 22 is dependent upon the acoustic frequency and, in turn, upon the frequency of the applied electrical signal.

Biasing and sensing circuit 20 will be more fully described hereinafter in connection with FIG. 2.

Transmitter 26 comprises power amplifiers when the transmission loop established with receiver 27 is a baseband loop and also includes frequency converters when the transmission loop is a radio-frequency loop, whether conversion is performed at the subscriber station set or more remotely in a telephone central office. Frequency converters would in general be employed in a broadcast television system utilizing the invention.

A baseband version of receiver 27 will be more fully described hereinafter in connection with FIG. 7. In the event that frequency conversion has been performed in the transmitter, the inverse step of frequency conversion is readily performed by conventional techniques as the first operation in receiver 27.

Figure 2:
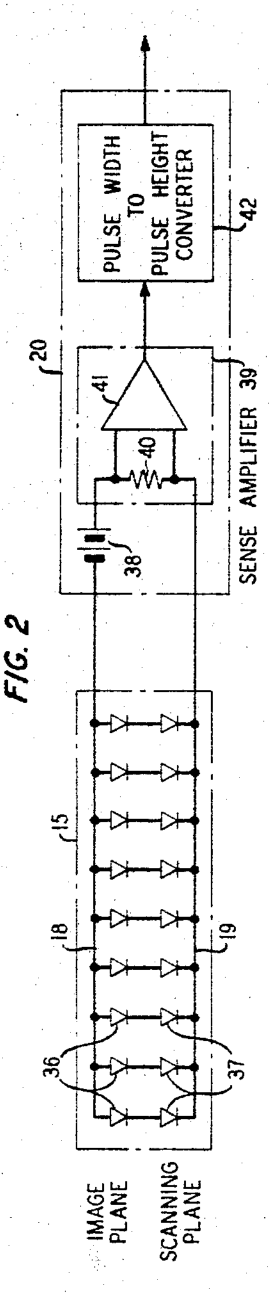
FIG. 2 is a schematic illustration of a photoelectric device according to the invention, together with its output circuit.

Turning now to FIG. 2, we see that the photoelectric device 15 according to the present invention comprises two layers of diodes, which can be represented as shown. The layer 16 of FIG. 1 includes the diodes 36 of FIG. 2, and the layer 17 of FIG. 1 includes the diodes 37 of FIG. 2. Each of the diodes 36 is connected in series with one of the diodes 37 between the output electrodes 18 and 19. Electrodes 18 and 19 are connected across the input of the biasing and sensing circuit 20. The negative terminal of biasing source 38 is connected to the electrode 18 and the positive terminal of source 38 is connected through a sense resistor 40 to the electrode 19. Sense resistor 40 is the input circuit of a sense amplifier 39, which also includes a buffer amplifier 41. The output of amplifier 41 is connected to the input of pulse-width-to-pulse-height converter 42. It is noted that the diodes 36 form an image plane for the lens 14 of FIG. 1 and that the diodes 37 form a target, or scanning, plane for the mechanical scanner 23 of FIG. 1.

Each diode 36 has an inherent capacitance that is advantageously at least ten times the inherent capacitance of the series connected diode 37. Each diode 36 has an electron-hole pair lifetime that is sufficient to permit a substantial portion of the electron-hole pairs produced therein to be separated across the depletion layer associated with its rectifying barrier. Diode 37 has an electron-hole pair lifetime that is preferably less than 0.1 $\mu$second, which is much less than the scan period. The scan period is the period of illumination of each diode 37 and is about 1.7 $\mu$seconds.

Sense resistor 40 has a value such that its product with the capacitance 52 of diode 37 is less than 0.1 $\mu$second.

Pulse-width-to-pulse-height converter 42 is of the type described in Patent No. 2,421,025 issued May 27, 1947 for the invention of D. D. Grieg, but with the low pass filter 17 shown therein removed from the circuit output.

The operation of the acoustic scanner 22 may be readily apprehended from the above-cited application of Lenzo et al.; and the operation of the mechanical scanner 23 may be readily apprehended from pages 267 and 268 of the above cited book by Zworykin and Morton.

The operation of the photoelectric device 15 may be understood as follows. As depicted in the equivalent circuit of FIG. 3, an image diode 36 responds to incident radiation as if it were a current generator 51 in parallel with a capacitor 52. The action can be viewed this way because the incident radiation creates electron-hole pairs and separates these charges across the diode junction to create a change in potential that makes the diode anode less negative with respect to the cathode. It can be seen that a depletion layer having a substantial area and a thickness as small as feasible between the anode (p-type region) and cathode (n-type region) of diode 36 will give it a substantial capacitance.

Because of the intermittent but intense illumination that a scan diode 37 receives, the scan diode responds to the scanning beam as a current generator 55 connected through a switch 53 to a shunt load consisting of an ideal diode or varistor 56 in parallel with a capacitor 54. The response of scan diode 37 is substantially different from that of diode 36 as a result of substantially different values of capacitance and illumination.

It can be seen that a depletion layer between the anode (p-type region) and the cathode (n-type region) of diode 37 that has a smaller area and/or greater thickness than the depletion layer of diode 36 will give diode 37 a smaller capacitance than diode 36. This relationship is desired because relatively little change in the stored charge of the capacitance 54 will produce a voltage change equal and opposite to the voltage change across the capacitance 52 in order to satisfy Kirchoff's voltage law around the loop including source 38 during the charge storage period. The response of camera 13 to the incident image is maximum when the least possible charge is stored in the capacitance 54, as compared to the stored charge of the capacitance 52.

The operation of the photoelectric device 15 and the bias and sensing circuit 20 in response to the incident image and the scanning beam may now be more fully described with reference to FIGS. 4 and 5 in view of FIG. 3.

Figure 3:
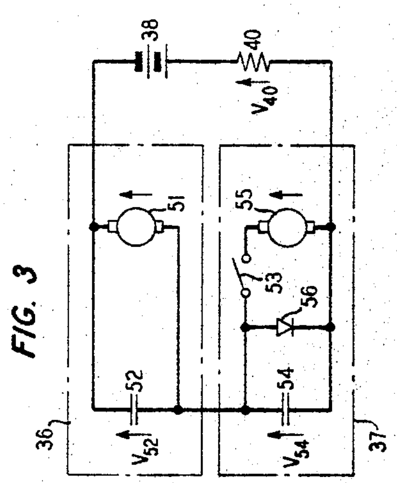
FIG. 3 is a schematic equivalent circuit of a pair of series-connected diodes of the types employed in a photoelectric device according to the present invention and will aid explanation and understanding of the invention.
Figure 4:
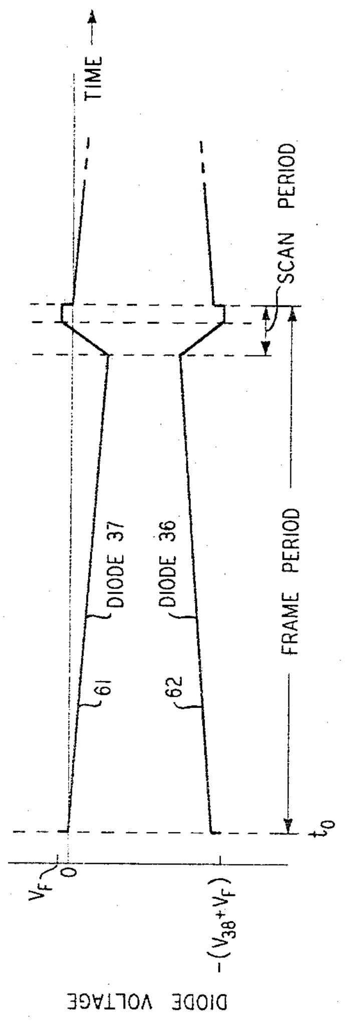
FIGS. 4 and 5 show curves that are helpful in understanding the theory and operation of the invention.
Figure 5:
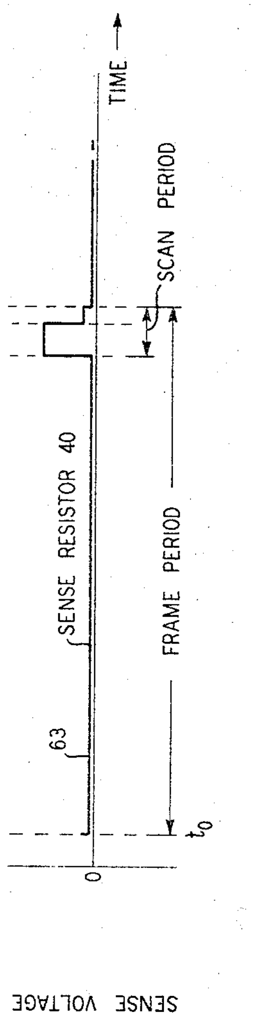

Assume that at the time $t_0$ in the curves 61, 62 and 63 of FIGS. 4 and 5 the scanning beam has just finished illuminating the particular diode 37 illustrated in FIG. 3. In other words, switch 53 has been closed long enough for diode 37 to acquire a small forward bias $V_F$ (positive toward diode 36), as shown in curve 61 of FIG. 4. At time $t_0$ the switch 53 has opened; and the voltage across diode 37 starts to decrease as the negative voltage across diode 36 also starts to decrease, as shown by curve 62 of FIG. 4. During the ensuing portion of the frame period, generator 55 is without effect; and the rate of change of voltage across both capacitances 52 and 54 is determined by the current delivered by generator 51.

$$\frac{dV_{52}}{dt}=\frac{-dV_{54}}{dt}\doteq\frac{i_{51}-i_{54}}{C_{52}} \tag{1}$$

The rates of change of the voltage across capacitances 52 and 54 are the slopes of curves 61 and 62, respectively, during the first portion of a frame period. In order for the voltage across capacitance 54 to change with switch 53 open, a small displacement current must flow through capacitance 54 via generator 51, source 38 and sense resistor 40, as illustrated by curve 63 of FIG. 5 during the first portion of a frame period.

$$i_{54}\doteq\frac{C_{54}i_{51}}{C_{52}+C_{54}} \tag{2}$$

which is a nearly negligible fraction of $i_{51}$ because $C_{52}$ is so much larger than $C_{54}$. Consequently, we can neglect the voltage drop $i_{54} \times R_{40}$ during this period of time. Sense amplifier 39 is provided with a high pass frequency response which discriminates against $i_{54} \times R_{40}$ without substantially affecting the sensitivity and optical definition of camera 13.

It is noted that the starting point of curve 62 for diode 36 at a voltage of $-(V_{38}+V_F)$ is determined by the previously attained forward bias of diode 37 and the voltage supplied by source 38 in the loop containing it. Thus, diode 36 is continuously back-biased; and the stored charge acquired in response to the incident image actually decreases the total charge stored in capacitance 52. The manner in which capacitance 52 delivers an output pulse responsive to the incident image can be explained as follows.

When diode 37 is again illuminated by the scanning beam, switch 53 is closed (electron-hole pairs being created in diode 37) and current generator 55 drives diode 37 toward a forward-bias condition.

There is an initial scanning transient during which capacitance 54 charges relatively rapidly, as compared to the rate shown by curve 61 at the start of the scan period. During this initial transient the current across resistor 40 builds up to the value shown in curve 63 at the start of the scan period. Because of the very small size of resistance 40, this transient is not visible on the time scale of FIGS. 4 and 5. In other words, the time constant of the transient is less than 0.1 $\mu$second, which is much less than the scan period, which is about 1.7 $\mu$seconds.

It should be further borne in mind that the voltage scale of FIG. 5 is very greatly magnified as compared to the voltage scale of FIG. 4.

After the initial scanning transient, the current through sense resistor 40 stabilizes at a value determined by the intensity of the scanning beam and the ratio of capacitance 52 to the sum of the capacitances. Also, the rates of change of the voltages across capacitances 52 and 54 again become equal and opposite. The aforesaid current through sense resistor 40 is sustained until the original charges of capacitances 52 and 54 are restored, that is, until the diode 37 is again forward biased. At this point, capacitance 52 has fully passed its previously accumulated charge (or change of charge) through the sense resistor 40. The elapsed portion of the scanning period is essentially linearly related to the radiation intensity falling on the image diode 36. That is, the output pulse width is directly related to the image radiation intensity.

At the end of this portion of the scan period, another rapid transient occurs, whereby the current through sense resistor 40 falls to $i_{51}$, which is the continuing current production in diode 36 in response to the image radiation. It will be noted that the forward bias of diode 37 (and equivalent diode 56) insures that all of $i_{55}$ now effectively bypasses the diode capacitance. Again, the transient is not visible in the curves 61, 62 and 63 of FIGS. 4 and 5 because of their time scales.

The voltages across diodes 36 and 37 do not change during the final portion of the scan period. It should be apparent from this fact that this portion of the scan period should always last some finite time for all image radiation intensities below the maximum expected intensity and that it should become zero only for the maximum image radiation intensity. The circuit parameters, i.e., bias voltage and scanning beam intensity, are chosen accordingly.

Finally, at the end of the scan period, another brief transient occurs. During this transient, the current through sense resistor 40 falls still further to its value during the initial portion of the new frame period. After this transient, capacitances 52 and 54 again charge at equal rates in opposite polarities in response to the incident image radiation.

It should be noted that the sense current pulse obtained during the first portion of the scan period has a substantial amplitude because of the relatively great intensity of the scanning beam and the fact that the charges continuously accumulated during a frame period are removed during a portion of a scan period. The resulting sense voltage pulse is easily amplified by buffer amplifier 41; and its duration is converted to a corresponding amplitude of a pulse at the output by pulse-width-to-pulse-height-converter 42. Thus, as different diodes 37 are scanned, an amplitude-modulated pulse train is obtained at the output of converter 42. This pulse train is similar to an ordinary television signal.

Figure 6:
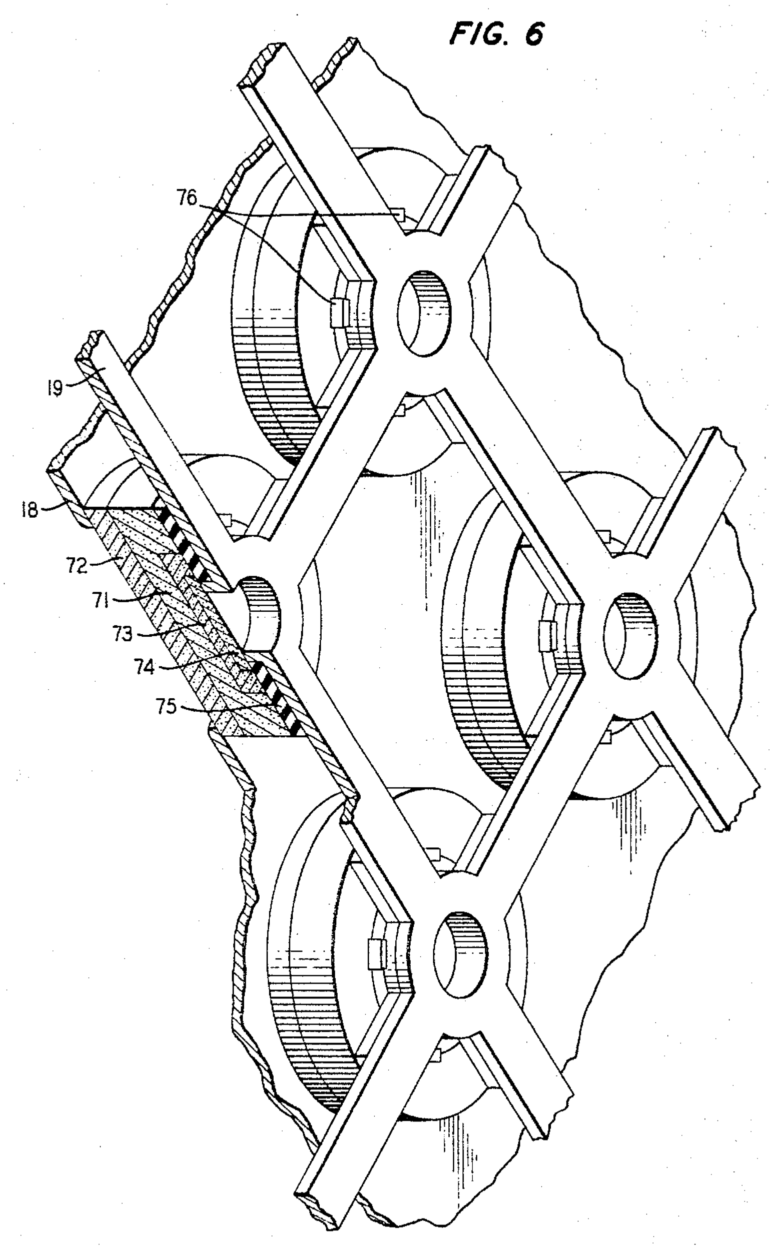
FIG. 6 is a pictorial illustration of a preferred embodiment of the invention, such as employed in FIG. 1, wherein details of the preferred beam-lead construction are shown.

A preferred construction of the photoelectric device is shown in FIG. 6.

Starting with a continuous sheet 71 of n-type single crystal silicon doped with phosphorus, continuous p-type layers 72 and 73 are epitaxially formed on both large area surfaces of sheet 71. At the desired coordinate location of each diode pair, a desired circular area of the p-type region 73 is masked; and an n-type dopant is diffused into the unmasked area of 73 to delineate separated p-type regions 73. This process extends the layer 71 to the surface in the unmasked area of layer 73, giving layer 71 its U-shaped cross-section. In another separate and distinct oxide masking operation, all upper surfaces are masked except a small circular region through which a shallow n-type diffusion delineates another n-type region 74. In this process, layer 73 assumes a U-shaped cross section.

An oxide pattern 75 is now formed on the surface of layers 71, 73, 74. It is in the form of an open annulus, just covering the surface intersection of layers 73 and 74, with four oxide lines extending outwards from the annulus and connecting to the four next nearest neighboring diode sites. The oxide pattern is obtained by first growing an oxide film followed by photomasking and etching techniques. A heavy layer of copper, of the order of 0.5 mil thick, is then plated on both surfaces. Through suitable photomasking and etching techniques, a circular opening in the copper is obtained on the surface of layer 72 to form patterned electrode 18; and a patterned electrode 19 is obtained on the opposite surface, matching the previous oxide pattern 75, with the exception that electrode 18 extends beyond that previous oxide pattern to contact the central region 74 of each diode pair, simultaneously, shorting bars 76 are formed to make electrical connection between regions 71 and 73.

A photomask is now placed over the surface 71 and another on the opposite surface 72. The former protects the electrode 19 and the surfaces 71, 73 and 74 out to the desired limits of each diode pair. The latter mask protects a circular region larger in diameter than the circular opening in the copper on surface 72. A suitable etchant now is applied to the device to etch away the semiconductor completely in the unprotected region down to the electrode 18, thereby forming a pattern of pills interconnected by the copper patterned electrodes 19 and 18. The electrodes 18 and 19 form the complete structural support for the assembly as well as the electrical output terminals. The large circular openings in electrode 18 are the light-admitting apertures for the large-capacitance image diodes that include the junctions of regions 71 and 72. The small circular openings in patterned electrode 19 are the light-admitting apertures for the smaller, low-capacitance scan diodes that include the junctions of regions 73 and 74. The metal shorting bars 76 provide the ohmic path required between the two diodes.

In FIG. 6, layers 71 and 72 form an image-responsive diode 36, the illumination from the subject being admitted through the aperture in electrode 18; and layers 73 and 74 form a scan diode 37, the scanning beam being admitted through the small circular aperture in electrode 19.

It will be seen in FIG. 6 that the relatively large junction area of layers 71 and 72 facilitates the provision of a large capacitance in a diode 36, while the relatively small junction area of layers 73 and 74 facilitates the provision of a relatively small capacitance in a diode 37. The depletion layer thicknesses at the respective junctions can be controlled during the above-described fabrication process by techniques well-known in the art.

In any event, the ratio of the capacitance of diode 36 to the capacitance of diode 37 is preferably 10 to 1, or more.

Figure 7:
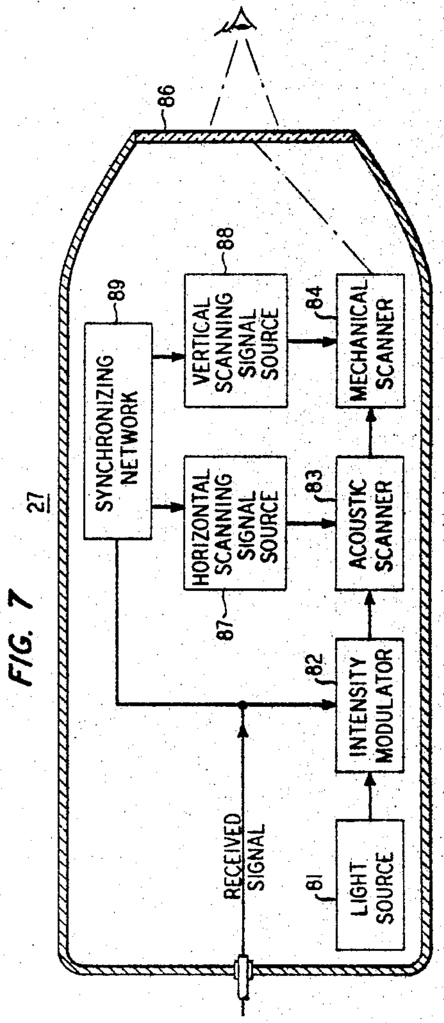
FIG. 7 is a partially pictorial and partially block diagrammatic illustration of a receiver preferred for employment in conjunction with the invention, as in FIG. 1.

The receiver 27 of FIG. 1 receives the signal transmitted from transmitter 26 and recreates an image of the subject 11 by a scanning process, as illustrated in FIG. 7, similar to that performed in camera 13. Light from an ordinary incandescent source 81 is modulated by the received signal in a conventional intensity modulator 82, which may comprise a Kerr cell between crossed polarizers. The intensity modulated light is passed through an acoustic scanner 83 like scanner 22 of FIG. 1 and a mechanical scanner 84 like scanner 23 of FIG. 1 and strikes a ground glass plate 86, which serves as a viewing screen.

The scanning signals are generated by sources 87 and 88, which produce frequencies like those of sources 25 and 24, respectively, of FIG. 1 but are synchronized by the received signal through a conventional synchronizing network rather than being synchronized by line frequency.

In general, it should be understood that any television receiver with compatible scanning rates may be used for receiver 27 of FIG. 1, instead of that shown in FIG. 7. An ordinary home television receiver may be readily adapted to this purpose.

In all cases it is understood that the above-described arrangements are illustrative of a small number of the many possible specific embodiments that can represent applications of the invention. Numerous and varied other arrangements can readily be devised in accordance with these principles without departing from the spirit and scope of the invention. In particular, other forms of diodes may be employed including diodes in which the rectifying barrier or depletion layer is associated with the interface between a semiconductor and an appropriate conductor.

What is claimed is:

1. A device for translating an image, comprising a first set of photosensitive elements capable of producing continuously changing charge storage in response to continuing incident radiation that forms said image, output terminals, and a second set of photosensitive elements connected serially with respective ones of said first set of elements across said output terminals and shielded from said image, said second set of elements when darkened blocking the leakage of charge from said first set of elements, said first and second sets of elements being mutually adapted to pass substantially all of the changed stored charge from any one of said first set to said output terminals when the serially connected one of said second set is illuminated, and said first and second sets of photosensitive elements each including a rectifying barrier exhibiting capacitance, the capacitance of the barrier of each of the first set of photosensitive elements being substantially greater than the capacitance of the barrier of the serially connected one of the second set of elements.

2. A device according to claim 1 in which the barrier area of each of the first set of photosensitive elements is substantially greater than the barrier area of the serially connected one of the second set of photosensitive elements.

3. A device according to claim 1 in which the rectifying barriers of the first and second sets of elements have depletion layers, the depletion layer of each of the first set of elements being substantially thinner than the depletion layer of the serially connected one of the second set of elements.

4. A device according to claim 1 in which the serially connected one of the second set of photosensitive elements provides an electron-hole pair lifetime that is substantially shorter than the duration of illumination of said one of the second set of photosensitive elements.

5. A device for translating an image, comprising a first supporting electrode forming essentially a continuous sheet and having therein a first regular array of apertures of a first size, a first set of silicon diodes each having an n-type region, a p-type region and a junction therebetween having a first area and a first depletion layer thickness, like regions of said first set of diodes being disposed over said apertures in ohmic contact with said first electrode, a second set of silicon diodes each having an n-type region, a p-type region and a junction therebetween having a second area substantially less than said first area and a second depletion layer thickness substantially greater than said first depletion layer thickness, like regions of said second set of diodes being contiguous with the opposite type regions of said first set of diodes, which opposite type regions are not in contact with said first electrode, ohmic connections between said contiguous regions, said ohmic connections being mutually isolated, and a second supporting electrode contacting the regions of said second set of diodes of type opposite to the type of regions of said first set of diodes in contact with said first electrode and having therein a second regular array of apertures of a second size smaller than said first size, said apertures of said second array being disposed over portions of said regions contacted by said second electrode.

6. A device according to claim 5 including a source of bias voltage connected between the first and second electrodes in a polarity to reverse-bias the first set of diodes and reverse-bias unilluminated ones of said second set of diodes.

7. A device according to claim 6 including a sense resistor connected serially between the bias voltage source and the first and second electrodes, said resistor having a value providing circuit time constants substantially less than the duration of illumination of each diode of the second set, whereby the width of each current pulse therein is directly related to the intensity of the incident image radiation upon each corresponding diode of the first set.

References Cited

UNITED STATES PATENTS

| | | | |
|---|---|---|---|
| 2,951,175 | 8/1960 | Null | 313—66 X |
| 3,283,160 | 11/1966 | Levitt et al. | |
| 3,322,955 | 5/1967 | Desvignes | 250—209 |

JAMES W. LAWRENCE, *Primary Examiner.*

E. R. LA ROCHE, *Assistant Examiner.*

U.S. Cl. X.R.

313—66, 96